United States Patent
Baudonnel

(10) Patent No.: US 7,004,205 B2
(45) Date of Patent: Feb. 28, 2006

(54) UNIDIRECTIONAL TEXTILE REINFORCING SHEATH CAPABLE OF BEING TAPED ONTO A MECHANICAL STRUCTURE TO BE REINFORCED

(75) Inventor: Jacques Baudonnel, Le Cheylard (FR)

(73) Assignee: Chomarat Composites, Paris (FR)

( * ) Notice: Subject to any disclaimer, the term of this patent is extended or adjusted under 35 U.S.C. 154(b) by 207 days.

(21) Appl. No.: 10/756,537

(22) Filed: Jan. 13, 2004

(65) Prior Publication Data

US 2004/0154684 A1 Aug. 12, 2004

(30) Foreign Application Priority Data

Jan. 21, 2003 (FR) .................................. 03 00614

(51) Int. Cl.
F16L 11/00 (2006.01)

(52) U.S. Cl. .............................. 139/384 R; 139/383 R; 139/420 A; 138/137; 138/168; 428/36.2; 285/14

(58) Field of Classification Search ............ 139/384 R, 139/383 R, 420 A; 138/137, 168, 125; 285/14, 285/223, 226; 428/36.2, 36.1
See application file for complete search history.

(56) References Cited

U.S. PATENT DOCUMENTS

| | | | |
|---|---|---|---|
| 2,672,168 A | 3/1954 | Gustav | 139/383 |
| 4,668,545 A | 5/1987 | Lowe | 428/36 |
| 4,800,929 A | 1/1989 | Watanabe | 139/383 |
| 5,299,603 A | 4/1994 | Reiter | 139/431 |
| 5,803,506 A * | 9/1998 | Argersinger et al. | 285/14 |
| 6,165,586 A | 12/2000 | Nouveau et al. | 428/105 |
| 6,328,080 B1 * | 12/2001 | Winters | 139/388 |
| 6,455,115 B1 * | 9/2002 | DeMeyer | 428/36.2 |
| 6,460,575 B1 * | 10/2002 | De Meyer et al. | 138/125 |
| 6,627,281 B1 * | 9/2003 | DeMeyer | 428/36.1 |
| 6,742,545 B1 * | 6/2004 | Fisher et al. | 138/137 |
| 6,887,543 B1 * | 5/2005 | Louart et al. | 428/36.9 |
| 6,899,140 B1 * | 5/2005 | Fraser et al. | 138/134 |
| 2001/0002971 A1 | 6/2001 | Kittson | 405/302.7 |
| 2004/0175523 A1 | 9/2004 | Gerez et al. | 428/36.9 |
| 2004/0175524 A1 | 9/2004 | Gerez et al. | 428/36.9 |

FOREIGN PATENT DOCUMENTS

| | | |
|---|---|---|
| DE | 195 25 689 | 11/1996 |
| DE | 198 57 517 | 6/2000 |
| DE | 198 57 034 | 8/2000 |
| FR | 2828722 | 8/2001 |
| WO | WO 03/016769 A1 | 7/2002 |
| WO | WO 03/016770 A1 | 8/2002 |

* cited by examiner

Primary Examiner—John J. Calvert
Assistant Examiner—Robert H Muromoto
(74) Attorney, Agent, or Firm—Heslin Rothenberg Farley & Mesiti P.C.

(57) ABSTRACT

A unidirectional textile reinforcing sheath capable of being taped onto a mechanical structure to be reinforced, said sheath being formed from a tape produced by the weaving of high-strength warp threads based on aramid, and having a central zone bordered by two lateral zones, the thickness of the lateral zones being less than that of the central zone.

8 Claims, 1 Drawing Sheet

UNIDIRECTIONAL TEXTILE REINFORCING SHEATH CAPABLE OF BEING TAPED ONTO A MECHANICAL STRUCTURE TO BE REINFORCED

TECHNICAL FIELD

The invention relates to the field of industrial textiles and more specifically to that of textiles used to form reinforcing sheaths. Such textiles therefore take the form of tapes which can be wound onto a mechanical structure to be reinforced. Mention may be made, as an example, of the reinforcements of pipes used in the field of the transport of fluids under pressure. These pipes are subjected to especially high stresses in terms of weight and pressure and even of temperature, thus making it necessary for them to have especially high capacities in terms of mechanical resistance.

The invention is aimed at improving the bursting resistance performance of such pipes.

PRIOR ART

In general terms, in all pipes used for applications ensuring the transport of gas or fluids under pressure, bursting resistance is imparted by ensuring the taping of a pipe produced from polymeric material with a high-performance textile tape wound helically. In general, the tapes used are produced on the basis of high-strength threads, such as aramid threads, glass threads or carbon fibers, but also polyester, polyethylene or polyamide threads. These textile tapes are usually warped unidirectional tapes, and they are obtained by weaving with weft threads of very low linear density, in order to limit contraction.

These tapes are subsequently arranged on the initial pipe by means of an application system which ensures that contiguous turns are produced. A plurality of layers may be necessary in order to ensure optimum reinforcement. However, it is often found that the accuracy of these application machines is unsufficient to ensure the exactly contiguous application of the various turns of tape. It may therefore happen that the space separating the tape having a width of the order of about ten centimeters amounts to several millimeters. The presence of this gap allows the taped pipe to undergo deformation by creep under the effect of high pressures and therefore to generate a bulge within the taping. This bulge is obviously a point of weakness, particularly in terms of shearing, on which are concentrated very high mechanical stresses which may ultimately lead to the bursting of the pipe. This is why solutions based on glass threads are not suitable. Another disadvantage of glass is that it requires certain handling precautions in order to preserve its intactness. Thus, as compared with synthetic threads, glass threads do not have sufficient flexibility to be capable of being wound or folded, while at the same time maintaining a proportionate resistance.

Conversely, it may happen that, because of the low accuracy of the machines for applying the tape, two successive turns of tape overlap slightly, thus forming a localized overthickness. This overthickness is subsequently increased as a result of the winding of the additional layers and consequently forms a point of embrittlement of the pipe. Phenomena involving relative slip between layers are likewise a source of embrittlement.

One object of the invention is to make it possible to produce a taping which has excellent bursting resistance in spite of the use of application machines of limited accuracy.

PRESENTATION OF THE INVENTION

The invention therefore relates to a reinforcing sheath capable of being taped onto a mechanical structure to be reinforced. This sheath takes the form of a tape produced by the weaving of high-strength warp threads based on high-performance synthetic threads, such as aramids.

According to the invention, this tape is defined in that it has a central zone bordered by two lateral zones, the thickness of which is less than the thickness of the central zone. In other words, the tape has lateral borders which are thinner than the central zone, thus allowing a slight overlap of the wound tape, without generating any overthickness, or at least with this possible overthickness being limited.

Thus, during taping, the application machine can be set in order to bring about this slight overlap which makes it possible to prevent the formation of bulges, of which the detrimental consequences in terms of bursting resistance were seen above. This slight overlap occurs without any pronounced overthickness, which was likewise seen above to be a disadvantage of the existing reinforcing tapes which have a constant thickness over their entire width.

In practice, the threads present in the lateral zones may have a linear density lower than those present in the central zone or, more generally, may have a lesser thickness than the threads used to form the central zone.

According to another characteristic of the invention, in these lateral zones, threads may be used which possess a capacity for elongation under traction which is greater than that of the threads of the central zone. Thus, the borders of the tape can undergo slight deformation in the overlap zones and therefore distribute the mechanical stresses in these particular zones.

In some embodiments, twisted threads can be used in the central zone, whereas the threads present in the border zones are twist-free or have a very limited twist, so as to optimize the relative elongations between the lateral zones and the central zone.

Advantageously, in practice, the weft threads used may be threads comprising at least one thermoplastic fraction, making it possible to ensure a slight bonding of the warp threads and therefore to hold the assembly when the tape has undergone a heating operation.

In practice, the widths of each lateral zone represent approximately 2 to 20% of the total width of the tape.

In a particular embodiment, one of the faces of the tape may have applied to it a film of thermoplastic material which makes it possible to ensure the protection of the tape with respect to the other layers and to protect the fibers with respect to ultraviolet rays, particularly when the threads used are based on aramid.

BRIEF DESCRIPTION OF THE FIGURES

How the invention is implemented and the advantages which emanate from it may be gathered from the description of the embodiment given by way of example, with reference to the single accompanying FIGURE which is a concise diagrammatic perspective view of a tape according to the invention.

IMPLEMENTATION OF THE INVENTION

Figure 1:
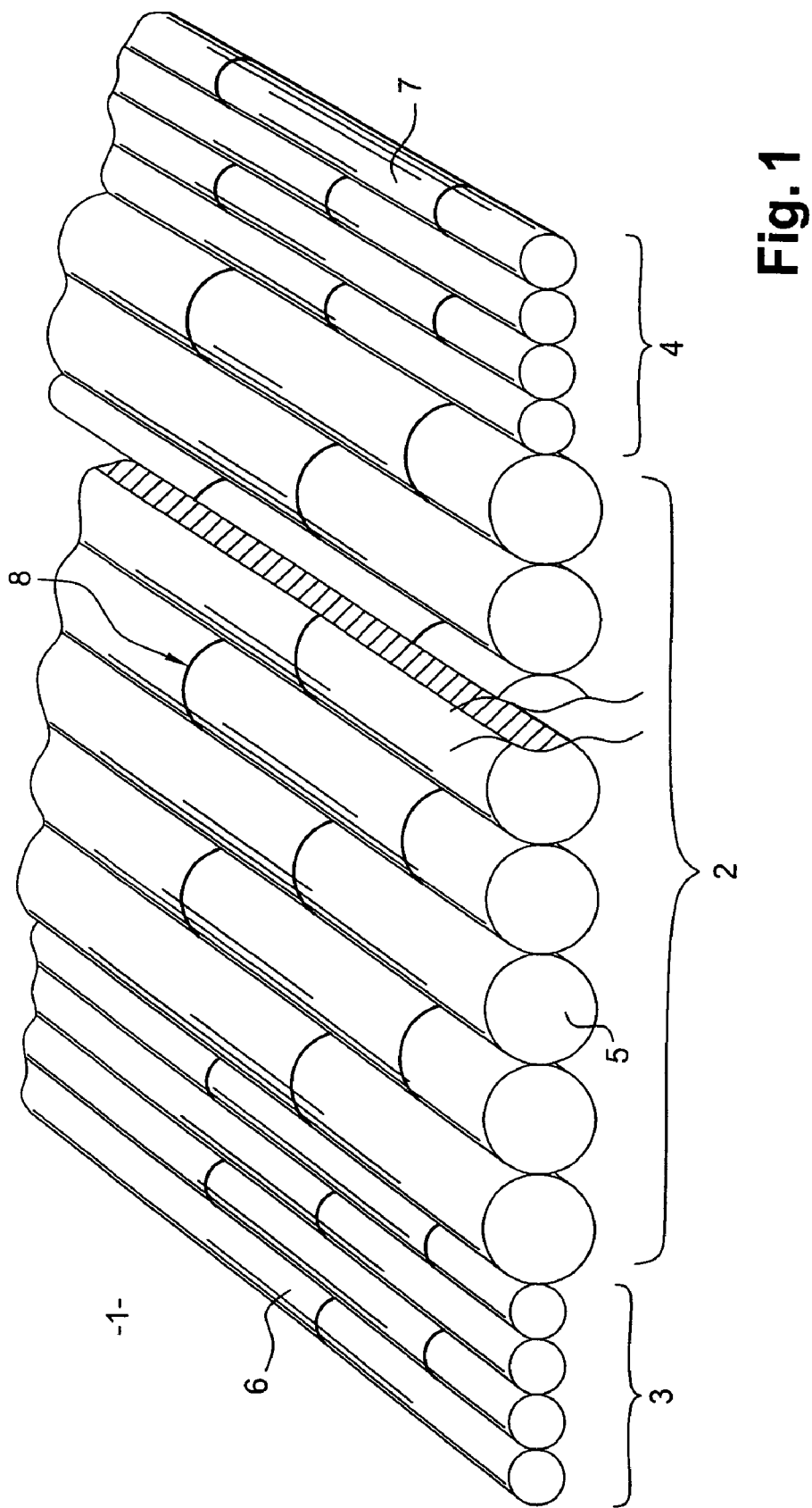

The warped unidirectional tape (1) described in FIG. 1 has a central zone (2) and two lateral zones (3, 4) forming the borders of the tape. The various warp threads (5, 6, 7) are woven with weft threads (8).

In practice, in the form illustrated, the central zone (2) has a width of between 10 and 200 mm, while the lateral zones (3, 4) have a width of the order of approximately 3 to 10 millimeters.

The thickness of the warp threads (5) of the central zone is relatively large, of the order of 0.8 to 1 mm, while the warp threads (6, 7) present in the lateral zones (3, 4) have a thickness of the order of 0.3 to 0.5 mm.

Good results were obtained using threads based on aramid, meta-aramid or para-aramid as warp threads (5) in the central zone. However, the invention also embraces the use of threads considered as equivalent to aramid in terms of mechanical resistance combined with high flexibility. This applies to synthetic threads, such as aromatic polyester or high-strength polyethylene, or to special threads, such as those based on liquid crystals.

The warp threads (5) may be multifilament threads with or without twist, or twist threads, with a linear density ranging from 330 to 680 tex, and, for example, with a twist of 60 turns, and preferably with an alternation of twisted threads in the direction Z and in the direction S. This use of two twist directions makes it possible to preserve the planeness of the tape and prevent kinking phenomena.

The warp threads (6, 7) used in the lateral zones (3, 4) may be continuous threads or threads obtained from spun fibers, so as to possess an elongation greater than the threads of the central zone. The same aramid threads may be used in the lateral zones as those used for the central zone. In practice, it is thus possible to produce tapes which have excellent mechanical properties of tensile strength, typically of the order of or greater than one tonne per centimeter of width.

In this weaving of high-modulus tape, in terms of weft, the threads used may be, for example, polyester threads coated with a thermoplastic material, so as to possess a linear density of the order of 40 tex, or else glass threads with a coating based on thermoplastic material. These threads then possess a linear density of the order of 20 to 70 tex and are twist-free. It should be noted that the weft threads have a linear density markedly lower than those of the warp threads, typically in a ratio of at least 1 to 10, in order to generate the lowest possible contraction for the warp threads. The functionality of these weft threads is to ensure that the geometric arrangement of the warp threads is maintained, even under slight tension during the subsequent handling and employment of the tape. This weft thread may be single or double at each insertion, depending on the choice of weaving material. This weft thread runs alternatively over the entire width of the fabric, at the same time being continuous over the entire length of the tape, without the need, therefore, for stitching or for the formation of selvages.

It may be gathered from the above that the tape according to the invention can be taped, with overlap zones being generated which ensure a continuity of reinforcement over the entire overlapped surface. These overlap zones, however, do not generate any overthickness or zones forming brittle points, as is the case with tapes of the prior art. The overlap of the lateral zones allows the use of less complex and more rapid laying means than those used hitherto, hence with savings in terms of manufacturing cost.

This tape can be used in very many applications in which it is either used as such or alternatively impregnated with a heat-setting resin. It can therefore be used in the manufacture of pipes, tubes and other parts of revolution, but also in the reinforcement of existing structures, such as bridge piers.

What is claimed is:

1. A unidirectional textile reinforcing sheath helically wound with overlapping zones onto a mechanical structure to be reinforced, without forming an overthickness or zones forming brittle points said sheath being formed from a tape comprised of high-strength synthetic warp threads based on aramid, woven with weft threads, the tape has a central zone bordered by two lateral zones, and thickness of the lateral zones is less than thickness of the central zone.

2. The sheath as claimed in claim 1, wherein threads present in the lateral zones have a linear density lower than threads present in the central zone.

3. The sheath as claimed in claim 1, wherein threads present in the lateral zones have a thickness less than threads present in the central zone.

4. The sheath as claimed in claim 1, wherein threads present in the lateral zones possess a capacity for elongation under traction greater than that of threads of the central zone.

5. The sheath as claimed in claim 1, wherein threads of the central zone are twisted, and threads present in the lateral zones are twist-free.

6. The sheath as claimed in claim 1, wherein the weft threads comprise at least one thermoplastic fraction.

7. The sheath as claimed in claim 1, wherein widths of each lateral zone represent from 2 to 20% of width of the tape.

8. The sheath as claimed in claim 1, wherein at least one of faces of the tape comprises a protective film of thermoplastic material.

* * * * *